(12) United States Patent
Kumar et al.

(10) Patent No.: US 8,782,347 B2
(45) Date of Patent: Jul. 15, 2014

(54) CONTROLLABLY EXITING AN UNKNOWN STATE OF A CACHE COHERENCY DIRECTORY

(75) Inventors: Ganesh Kumar, Fort Collins, CO (US);
Dheemanth Nagaraj, Bangalore (IN);
Vincent R. Freytag, Windsor, CO (US);
Eric DeLano, Fort Collins, CO (US);
Gregory S. Averill, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 1262 days.

(21) Appl. No.: 12/492,280

(22) Filed: Jun. 26, 2009

(65) Prior Publication Data

US 2010/0332767 A1     Dec. 30, 2010

(51) Int. Cl.
*G06F 13/28* (2006.01)
*G06F 12/08* (2006.01)
*G06F 9/50* (2006.01)

(52) U.S. Cl.
CPC .......... *G06F 12/0817* (2013.01); *G06F 9/5033* (2013.01)
USPC ............ 711/141; 711/144; 711/145; 711/146

(58) Field of Classification Search
CPC ........................... G06F 12/0817; G06F 9/5033
USPC .................................. 711/141, 144, 145, 146
See application file for complete search history.

(56) References Cited

U.S. PATENT DOCUMENTS

| | | | |
|---|---|---|---|
| 5,699,510 A * | 12/1997 | Petersen et al. | 714/54 |
| 6,009,488 A | 12/1999 | Kavipurapu | |
| 6,349,368 B1 * | 2/2002 | Arimilli et al. | 711/144 |
| 6,532,519 B2 * | 3/2003 | Arimilli et al. | 711/119 |
| 6,640,289 B2 * | 10/2003 | McCrory et al. | 711/144 |
| 6,742,086 B1 * | 5/2004 | Cotugno et al. | 711/141 |
| 7,962,696 B2 * | 6/2011 | Steely et al. | 711/145 |
| 8,055,851 B2 * | 11/2011 | Chinthamani et al. | 711/141 |
| 2002/0095554 A1 * | 7/2002 | McCrory et al. | 711/144 |
| 2007/0073856 A1 * | 3/2007 | Tsien | 709/223 |
| 2008/0147986 A1 * | 6/2008 | Chinthamani et al. | 711/141 |

OTHER PUBLICATIONS

Huggahalli, Ram, Ravi Iyer, and Scott Tetrick. "Direct cache access for high bandwidth network I/O." ACM SIGARCH Computer Architecture News. vol. 33. No. 2. IEEE Computer Society, 2005.*
Soundararajan, Vijayaraghavan, et al. Flexible use of memory for replication/migration in cache-coherent DSM multiprocessors. vol. 26. No. 3. IEEE Computer Society, 1998.*

* cited by examiner

*Primary Examiner* — Sanjiv Shah
*Assistant Examiner* — Samuel Dillon
(74) *Attorney, Agent, or Firm* — Trop, Pruner & Hu, P.C.

(57) ABSTRACT

In one embodiment, a method includes receiving a read request from a first caching agent and if a directory entry associated with the request is in an unknown state, an invalidating snoop message is sent to at least one other caching agent to invalidate information in a cache location of the other caching agent corresponding to the location of the read request, to enable setting of the directory entry into a known state. Other embodiments are described and claimed.

12 Claims, 6 Drawing Sheets

US 8,782,347 B2

CONTROLLABLY EXITING AN UNKNOWN STATE OF A CACHE COHERENCY DIRECTORY

BACKGROUND

Modern computer systems are generally formed of numerous components that are coupled together to interoperate and perform various processing functions under control of a central processor, commonly referred to as a central processing unit (CPU). Most systems typically include a collection of semiconductor devices including processors, peripheral devices, dedicated processing units and so forth, in addition to additional semiconductor devices that act as a system memory to provide storage for information used by the processing units. In many systems, multiple memories are present, each of which can be associated with a given processor that thus acts as local memory for the corresponding processor. However, data located in a memory associated with a first processor may need to be accessed by another processor.

To maintain the coherency of data across the system, a cache coherency protocol such as a directory-based protocol may be implemented in a system. In a directory-based cache coherence protocol, agents that guard the memory, often referred to as home agents (HAs), collectively maintain a directory that tracks where and in what state each cacheline is cached in the system. A caching agent (CA) that seeks to acquire a cacheline sends a request to a HA, which looks up the directory and sends messages, commonly referred to as snoops, to only those CAs which the directory indicates may have cached copies of the line. If the directory indicates that no cached copies exist or that only shared copies exist and the request is for another shared copy, no snoops need be sent and the request can be satisfied from memory. Thus in certain cases, the directory can eliminate the need for snooping all CAs for each request, reducing the bandwidth requirement of snoops.

Once snoop responses (if any) have been received, the state of the new directory entry is computed and stored into memory. Memory bandwidth is consumed to save the new directory state into memory, and this usage directly detracts from memory bandwidth available to an application.

In certain situations and usage models (e.g., memory migration and mirroring, disabling of directory entries due to uncorrectable memory errors (assuming the directory is maintained in memory), post-silicon validation, and manufacturing tests), the directory state cannot be determined for a given entry and the system must fall back to snooping all CAs for each request to such entry. In these situations, the directory is assumed to be an unknown state which thus can cause increased bus traffic due to the needed snoop message transmission. In other cases, bandwidth may also be consumed in maintaining the coherency information even where data is used by a single agent.

DETAILED DESCRIPTION

In various embodiments, an invalidating snoop procedure may be performed for requests that seek to access information in a memory location having a corresponding directory entry that is in the unknown state. In this way, the directory state can be reconstructed. For example, the processor uses an invalidation snoop message, e.g., a SnpInvItoE type of snoop responsive to receipt of a request for read access (e.g., a RdCode/RdData/RdCur) to a cacheline whose directory state is unknown. The SnpInvItoE snoop message has the property of always invalidating the line at the caching agent (CA) to which the snoop is sent. After the SnpInvItoE has been processed, the home agent (HA) can mark the directory as being in the exclusive state (e.g., E@requestor) for such read requests. This invalidating snoop operation enables reconstruction of the new directory state as being exclusive at the requesting CA. This is in contrast to other situations that preclude re-construction of directory state after responses have been received for all snoops that have been broadcast. For example, a snoop message associated with a read (SnpCur due to a RdCur request) can result in conflict snoop responses (RspCnflt) from multiple agents who have their own requests outstanding. It is not possible to tell from these responses whether the cache line is E at a single requestor, or shared (S) at multiple requestors.

Using an invalidating snoop message, the HA action table may be as follows:

TABLE 1

| Request Type | HA action for computing next directory state from unknown state |
| --- | --- |
| Invalidating request (RdInvOwn, InvItoE, InvXtoI) | Broadcast snoops, collect responses, new directory = exclusive@requesting CA |
| RdData/RdCode/RdCur | Broadcast SnpInvItoE snoops, collect responses, new directory = E@requesting CA |

In this way, embodiments provide for smoothly entering, staying, and leaving the unknown directory state in a directory-based cache coherence protocol. Embodiments can be performed on a per cacheline basis (i.e., each cacheline can enter and leave the unknown mode independently of all other cache lines). This transitioning in and out of the unknown state is seamlessly integrated with normal protocol flows.

Figure 1:
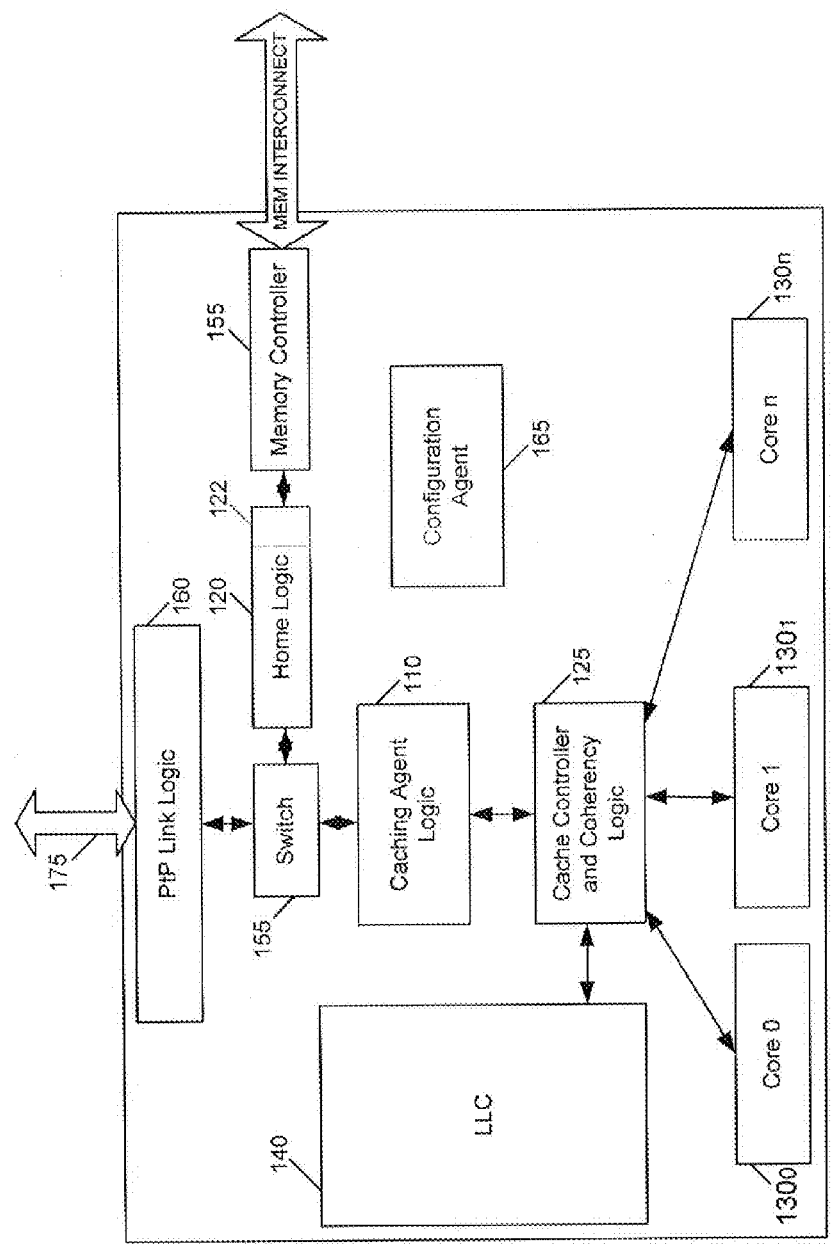
FIG. 1 is a block diagram of a processor in accordance with one embodiment of the present invention.

Referring now to FIG. 1, shown is a block diagram of a processor in accordance with one embodiment of the present invention. As shown in FIG. 1, processor 100 contains at least one caching agent logic 110 (referred to generally as a "caching agent") and one home logic 120 (referred to generally as a "home agent"). Note that the term "device" or "agent" is general and may be used to describe any electrical component coupled to a link. A "link" or "interconnect" is generally defined as an information-carrying medium that establishes a communication pathway for messages, namely information placed in a predetermined format. The link or interconnect may be a wired physical medium (e.g., a bus, one or more electrical wires, trace, cable, etc.) or a wireless medium (e.g., air in combination with wireless signaling technology). According to one embodiment, the term "home agent" is broadly defined as a device that provides resources for a caching agent to access memory and, based on requests from the caching agents, resolve conflicts, maintain ordering and the like. The home agent includes a tracker 122 and data buffer(s) for each caching agent as described below. A "tracker" is dedicated storage that may buffer requests associated with various agents. As will be described further below, the tracker can be dynamically configured based on a system configuration to efficiently utilize its resources (e.g., entries). According to one embodiment of the invention, a "caching agent" is generally a cache controller that is adapted to route memory requests to the home agent. In one embodiment, home agent 120 may support up to three caching agents, one caching agent for each processor and one caching agent for an input/output hub (IOH) write cache.

Cores 130 may be connected to a last level cache (LLC) 140 using an on-die interconnect and via a cache controller 125. The cache domain including the LLC and the core caches is encapsulated by caching agent logic 110 and cache controller 125. This logic will implement the underlying cache domains as a single caching agent to a cache coherence system. The home agent logic protecting the memory connected to a local memory controller 155 is implemented in home logic 120. Caching agent logic 110 and home agent logic 120 are connected to a link logic 160 using a switching logic 155. Link logic 160 may support one or more point-to-point (PtP) links 175. Link logic 160 may transmit broadcast-based snooping of other processors.

As further shown, processor 100 further includes a configuration agent 165 that may primarily be used in configuring the processor into a system. As will be described further below, configuration agent 165 may have an identifier associated therewith for use in tracker 125 of home agent 120. However, as configuration agent 165 does not send memory requests to the home agent, embodiments may dynamically allocate tracker entries to other agents such that entries that would otherwise be dedicated to configuration agent 165 can be more efficiently used by other system resources.

Recovering from the unknown directory state may be particularly applicable in the following cases: (1) upon an uncorrectable dynamic random access memory (DRAM) error, assuming the directory is kept in memory, the directory state can always be reconstructed and there is no snoop broadcast penalty for future requests to that cache line; and (2) upon a memory controller failover, the directory at the failed-over memory controller always starts in the unknown state. The above described scheme allows the directory to exit the unknown state efficiently.

Thus transitions in accordance with an embodiment of the present invention into/out of the unknown state may be particularly useful in cases where memory (and associated directory information) is mirrored across node controllers. In such cases, directory information in a primary cluster is not provided to a mirrored cluster that includes a mirrored copy of data present in the primary cluster. As a result, the mirrored cluster is forced to mirror memory without associated directory tags. The mirrored cluster then reconstructs the directory based upon a request type received at the mirrored cluster (after the system has failed over to the mirrored cluster, i.e., address decoders route requests to the mirrored cluster, effectively making it the new primary cluster).

Figure 2:
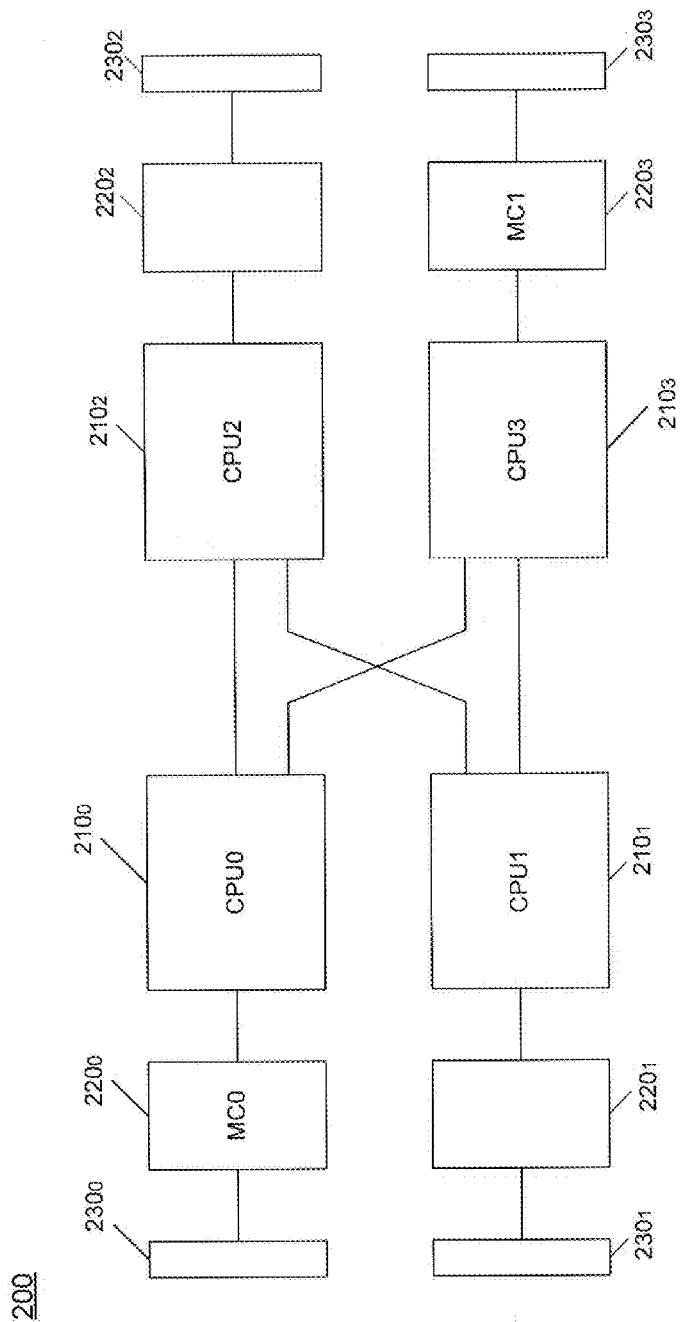
FIG. 2 is a block diagram of a system in accordance with one embodiment of the present invention.

As described above, embodiments may be used in many different system types. In certain implementations, the handling of an unknown directory state may be particularly appropriate for a mirrored system. Referring now to FIG. 2, shown is a block diagram of a system in accordance with one embodiment of the present invention. As seen in FIG. 2, a system 200 includes a plurality of sockets $210_0$-$210_3$. Each socket may include a processor such as described above with regard to FIG. 1, although other implementations are certainly possible. Each socket may be coupled to the other sockets by way of a PtP link. Still further, each socket may be coupled to a local portion of system memory, e.g., formed of a plurality of dual inline memory modules (DIMMs) that may include dynamic random access memory (DRAM). Specifically, as seen in FIG. 2, each socket 210 may be coupled to an associated memory controller $220_0$-$220_3$ which in turn may be coupled to a corresponding local portion of system memory $230_0$-$230_3$. In one embodiment, memory $230_0$ may be a master and memory $230_3$ may be a slave, e.g., to store mirrored data. While shown in the embodiment of FIG. 2 as being separate memory controller components, in certain implementations the memory controller may be integrated within the sockets, such as shown for example in the processor socket of FIG. 1.

An implementation such as shown in FIG. 2 thus may be for a socket clueless configuration with mirroring. Data assigned with memory controller $220_0$ (and memory $230_0$) is mirrored to memory controller $220_3$ (and memory $230_3$) over the PtP links. The directory of memory controller $220_3$ is initialized in the unknown (U)-state upon a copy to mirror. Upon failover to this controller (e.g., due to an online service-call for memory controller $220_3$), the directory can quickly be reconstructed from the U-state.

Figure 3:
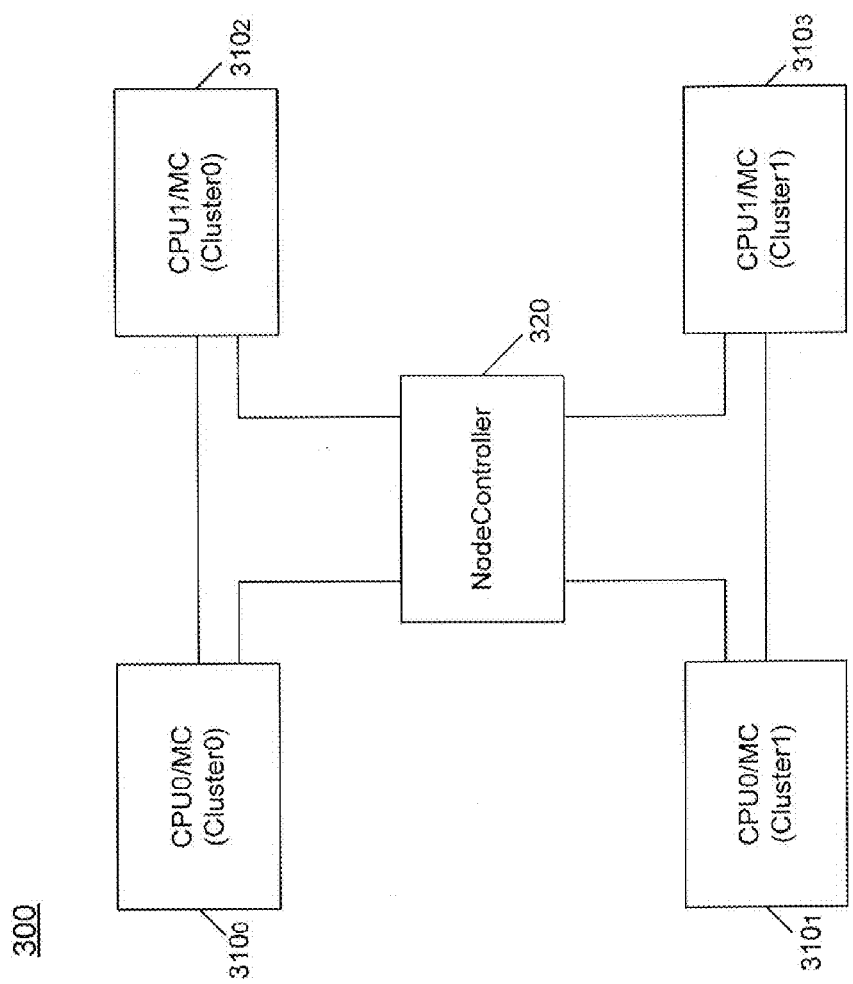
FIG. 3 is a block diagram of a clustered system in accordance with an embodiment of the present invention.

Another implementation in which embodiments may be used is shown in FIG. 3. In the embodiment of FIG. 3, a clustered system is provided. Specifically, system 300 includes a plurality of clusters $310_0$-$310_3$. Each cluster may include a corresponding processor, memory controller, and memory. In turn, each cluster may be coupled to a node controller (NC) 320. Thus, two socket clusters are connected via a node controller. As an example, data is mirrored from cluster $310_0$ (Cluster0-CPU0) to cluster $310_3$ (Cluster 1-CPU1). Directory tags in Cluster0 are not relevant for Cluster1. Mirroring with the U-state, and then providing quick reconstruction of a directory from the U-state in accordance with an embodiment of the present invention thus allows for efficient mirroring across a node controller boundary.

Figure 4:
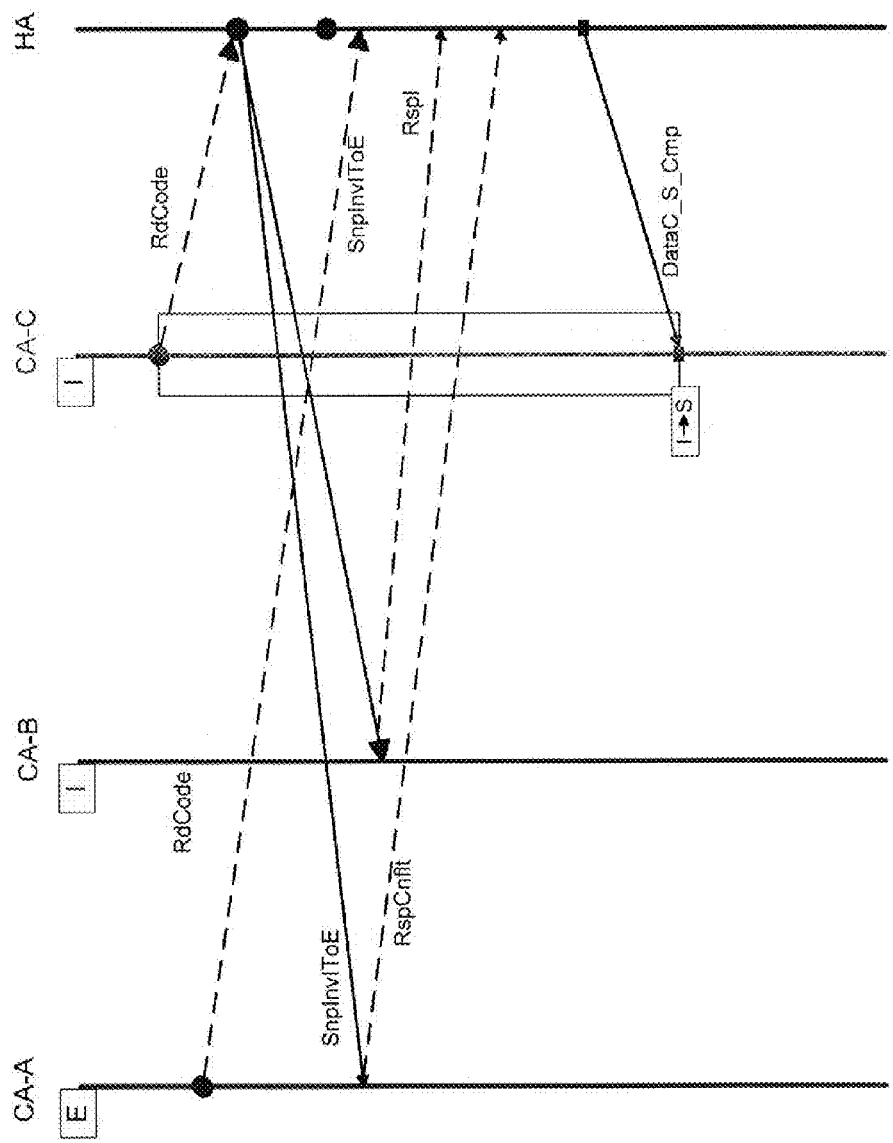
FIG. 4 is a flow diagram of an example scenario of handling a read request when a directory is in the unknown state in accordance with one embodiment of the present invention.

Referring now to FIG. 4, shown is an example scenario of how a read request (RdCode) is handled when the directory is in the unknown state in accordance with one embodiment of the present invention. As shown in FIG. 4, the HA (H) uses an invalidating-type snoop (SnpInvIToE) to update its knowledge about where and in what state a line is cached. In this example, the line is cached exclusive (E) at a first caching agent (CA)-A. A second caching agent (CA-C) issues a read request, e.g., RdCode request. At the same time CA-A issues a RdCode for the same address. The request from CA-C is serviced first, and a read of the memory to fetch the line and the directory bits occurs. The read results in an uncorrectable error, and the directory state is assumed to be unknown. Since the request is a RdCode request and the directory state is unknown, the HA broadcasts an invalidating snoop message, SnpInvIToE, to the CAs, and a third caching agent (CA-B) responds to acknowledge the message with an invalid response (RspI) message. However CA-A has a request outstanding for this same line so it responds to indicate a conflict, RspCnflt. Since the snoop type was SnpInvItoE (and not SnpCode), the HA can assume that the line has been downgraded to invalid at CA-A. The HA now marks the directory as exclusive@CA-C, even though the data is provided to CA-C in the shared state (e.g., by a data completion) with data message (DataC-S-Cmp)). This scheme allows the directory to exit the unknown state even upon receiving a RspCnflt response.

Embodiments may further provide several directory optimization modes that dramatically reduce bandwidth consumed by directory updates. An attribute referred to herein as a processor affinity hint (PAH) is implemented for an arbitrary region of coherent distributed shared memory. The attribute is a performance hint that tells the HA to maintain directory state and owner information unchanged for a cache line writeback transaction (e.g., a WbMtoI) originating to this region of memory. In addition, clean cache line evictions to this region of memory are ignored. As such, cache evictions to regions of memory tagged with the PAH hint do not update the directory state. Still further, subsequent reads to such cache lines do not cause an update to the directory state either. This allows an application to stream reads/writes to memory with no directory tag update penalty.

Different manners of configurability for this hint can be provided in implementing the above directory optimization. In different embodiments, the optimization may be: based on a processor affinity hint in a target address decoder (TAD) entry for the region of coherent shared memory; based on a local socket identifier (ID) match (i.e., the CAs socket-id matches the socket-id of the HA, IOH/NC agents are excluded); or based on both (1) AND (2) (i.e., a logical AND). Note that in one embodiment, PAH configuration can be set by system firmware at boot-time. The decision about the type of PAH mode (e.g., TAD versus TAD_AND_LocalSocket versus TAD_OR_LocalSocket) can be made by firmware based on system/memory configuration, and may be proprietary to the system manufacturer.

Figure 5:
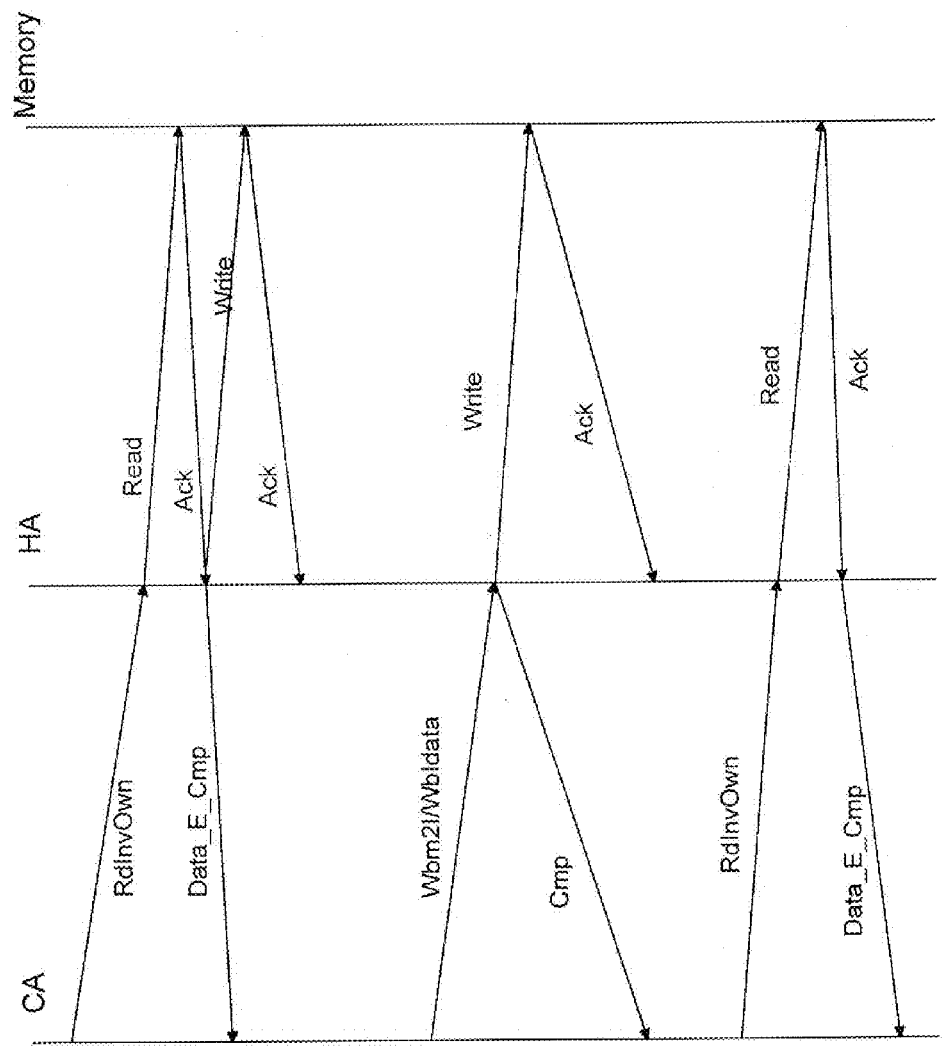
FIG. 5 is a flow diagram of an optimization mode in accordance with one embodiment of the present invention.

Referring now to FIG. 5, shown is a flow diagram of a PAH optimization mode in accordance with one embodiment of the present invention. Specifically, FIG. 5 describes the baseline PAH mode. Here a CA requests a line via a request for ownership (e.g., a RdInvOwn message) sent to the HA. In response to this, the HA obtains the data from memory (via a read and acknowledge (ACK)), and sends data back to the requestor as a completion, and in the background updates the directory to E@CA. Note that this update requires the HA to issue a write transaction to the memory, including the data and the updated directory information. This is the type of directory update (and memory bandwidth use) that embodiments attempt to avoid. Later, the CA evicts the line from its cache via a writeback transaction to the HA, as the data has been modified. If instead a capacity eviction were to occur (for clean data), there would be no need for the HA to write the data to memory, as ownership is already in the CA. In this case, the CPU informs the HA about a clean-eviction via an EvctClean request. In the PAH mode, the EvctClean request is "dropped." That is, the HA sends the CPU requestor a completion, but never updates the directory with the eviction information since the CPU will re-request the line again.

Here however, the HA writes the modified data to memory. However, because PAH optimization is in effect (e.g., a PAH attribute bit is set), the HA retains ownership as E@CA in the directory. Without the optimization provided by an embodiment of the present invention, the ownership information in the directory would have transitioned to the invalid (I) state. Later, the CA requests the line again, e.g., via a RdInvOwn transaction. The HA returns data to the requester. Since the directory is already E@CA, it need not waste memory bandwidth to update the directory.

A further enhancement to the above baseline modes is also provided. This enhanced mode may reduce memory bandwidth usage for producer/consumer traffic patterns. As one example of such a model, an IOH is the producer, and a CA on a HA socket is the consumer. In this mode, a request for ownership from an IOH for a cache line will cause the HA to store a hint in the directory tags along with ownership information about the previous owner, i.e., the local CA. On receiving a writeback for the IOH, the hint is retrieved and the directory ownership is speculatively transitioned to the local CA. It is noted that the term "speculative" means that the ownership is predicted to be to the intended owner in the future, but that the ownership transition actually occurs at the present time. This speculative transition eliminates the need for a memory directory update when the local CA (consumer) subsequently requests the cache line.

Figure 6:
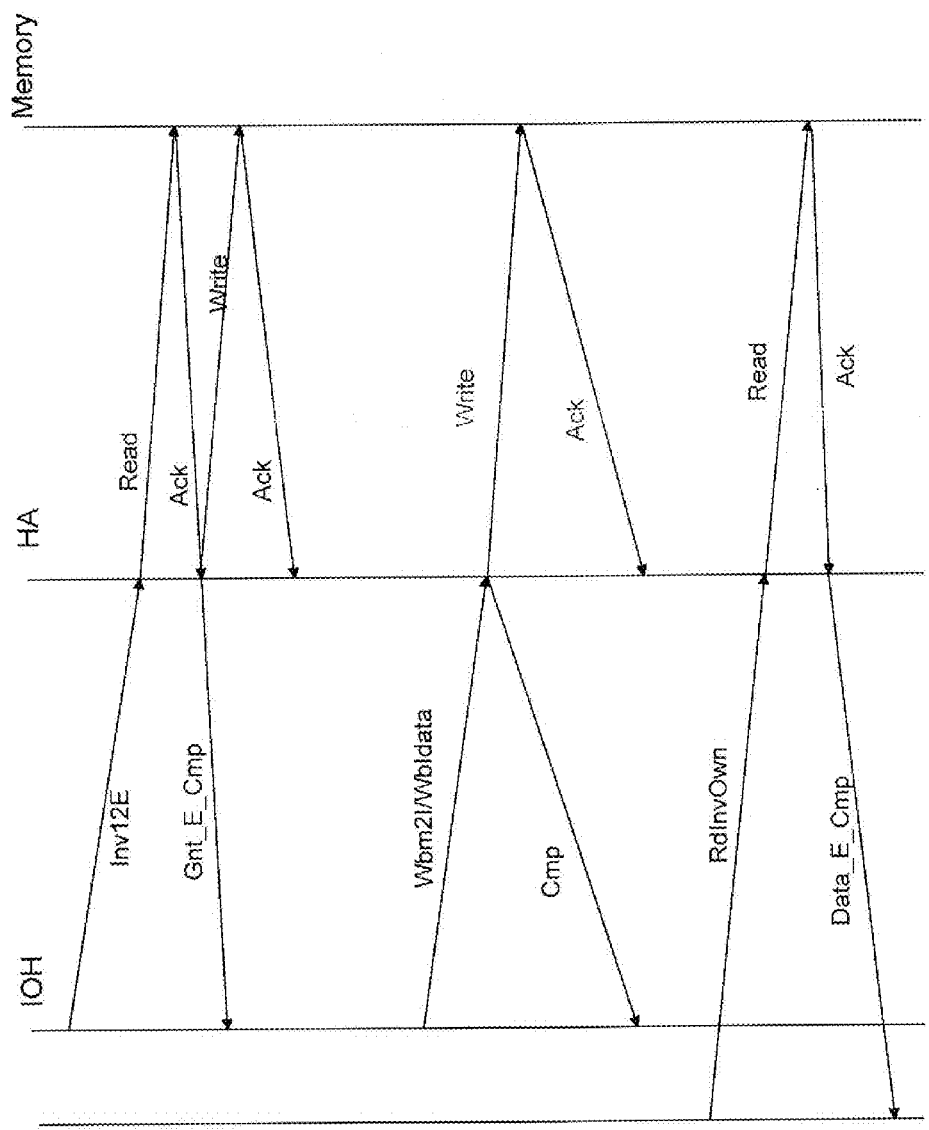
FIG. 6 is a flow diagram of an optimization mode in accordance with another embodiment of the present invention.

Referring now to FIG. 6, shown is a flow diagram of a PAH optimization mode in accordance with another embodiment of the present invention. Specifically, FIG. 6 describes the producer-consumer PAH optimization mode. In this implementation, an IOH requests ownership of the line, e.g., via an InvI2E message. In turn, the HA grants ownership and marks the directory as E@IOH. Then the IOH proceeds to writeback the line after storing to it, via a WbM2I request to the HA. The HA writes the data to memory, and transitions the directory to E@CA, as the producer-consumer mode has been established by the setting of the PAH hint. Then the IOH sets a flag for the consumer, indicating presence of the line in memory. When the consumer (CA) determines that the flag is set (e.g., via a polling operation), it requests the line from the HA (via a RdInvOwn) message. The HA supplies the data, and since the directory is already marked E@CA, no further directory update is required, thus reducing memory bandwidth.

In various embodiments, the PA optimization modes may provide double-digit performance gains for both socket local requestors (speculative operation, streams, etc.) as well as for producer-consumer flows. Thus using an embodiment of the present invention, additional memory bandwidth can be available to an application that exhibits high local memory usage, while maintaining cache coherency at all times even if multiple CAs request a region of memory that is tagged with the processor affinity hint. Embodiments thus allow for reduction in bandwidth consumed for directory updates in cases where a workload exhibits a large amount of processor affinity.

Embodiments further enable more efficient usage of agent resources, such as entries of one or more buffers, such as a tracker storage of a HA. Such a tracker may be used by a HA to pre-allocate resources to sink all possible outstanding requests from CAs. Caching agents may be CPU cores, IOHs, and node controllers (or other proxy agents in scale up systems). The number of entries of the tracker limits the total number of outstanding requests that target a specific HA. The tracker also limits the total number of outstanding requests that target a specific HA. The tracker also limits the total number of different CAs that can request the same line from memory.

In one embodiment, a tracker can be a 512 entry data structure, each entry having a data portion and an address portion. The address portion may include several fields, including a node identifier (NID) field and a transaction identifier (TID) field. The NID is used to uniquely identify each CA in the system and in one embodiment may be 6 bits. Simplistically, a 6 bit NID would support 64 CAs, and the tracker could be divided equally among the 64 CAs (8 requests each, each represented by a TID). In practice, the number of CPU CAs vastly outnumbers the IOH and node controller (NC) CAs. A technique in accordance with an embodiment of the present invention makes use of TID conventions to support more transactions per IOH/NC CA (versus CPU CA), and reuse tracker entries that are dedicated (but never used) for a configuration agent.

As a result, tracker entries in the various system configuration modes are not wasted, and in each configuration mode, the tracker can be shared among CPU and IOH/NC CAs in a manner that maximizes performance. In an embodiment in which each CPU socket includes 4 cores, 5 NIDs may be associated with a socket. To enable flexible use of tracker entries in one embodiment, the lower three bits of a NID may be encoded to uniquely identify agents within the processor socket in addition to possible NIDs used by external agents (IOH or NC). Table 1 shows the node-ID convention in accordance with one embodiment of the present invention.

TABLE 1

| Nid[2:0] | Agent |
|---|---|
| 000 | IOH/NC |
| 001 | CA0/HA0 |
| 010 | Configuration Agent |
| 011 | CA1/HA1 |
| 100 | IOH/NC |
| 101 | CA2 |
| 110 | IOH/CN |
| 111 | CA3 |

Referring now to Table 2, shown is an implementation of various tracker allocation modes in accordance with one embodiment of the present invention.

TABLE 2

| Mode | Config | Used NIDs | Core NIDs | IOH/NC NIDs | TID/Core | TID/IOH-NC | Socket Bits | IOH/NC NIDs | | |
|---|---|---|---|---|---|---|---|---|---|---|
| 0 | 8Socket | 40 | 32 | 8 | 8 | 32 | NID<5:3> | Xxx00 | | |
| 1 | 4S | 20 | 16 | 4 | 24 | 32 | <4:3> | Xx000 | | |
| 2 | 4S | 24 | 16 | 8 | 16 | 32 | <4:3> | Xx000 | xx100 | |
| 3 | 4S | 12 | 8 | 4 | 48 | 32 | <4:3> | Xx000 | | |
| 4 | 2S | 12 | 8 | 4 | 32 | 64 | <3> | Xx000 | xx110 | |
| 5 | 1S | 7 | 4 | 3 | 64 | 64 | — | 000 | 100 | 100 |

As shown in Table 2, various tracker allocation modes may be provided. Specifically in the embodiment in Table 2, six such modes may be available. Each of these modes may be associated with a given system configuration in which the tracker is used. Such system configurations can vary from a single socket system to an 8 socket system (1S and 8S). As seen, differing numbers of used NIDs are needed, due to the varying number of sockets present. Table 2 is for an embodiment in which each processor socket consumes 5 NIDs. Thus as seen, an 8 socket system consumes 40 NIDs. Table 2 further shows the breakdown of allocation of these NIDs between cores of a processor (e.g., caching agents) and IO hubs/node controllers. As seen, in the larger numbered socket systems (e.g., greater than one socket) there can be many more cores (and thus core NIDs) than IO hub/node controllers (and corresponding NIDs). However, as also seen in Table 2, fewer numbers of entries, each of which can be identified using an address of the tracker formed of the NID and a corresponding transaction identifier, can be attached to the cores. Specifically, fewer entries (and thus TIDs) can be allocated for each core than for each IO hub/node controller (in many configurations).

As further shown in Table 2, differing bit positions in the node identifier may be used for identifying a socket. As further seen, in the different allocation modes, different node identifiers for IO hub/node controllers may be used. To give several examples, assume a tracker allocation 0 mode (corresponding to an 8 socket system): to identify a first caching agent (i.e., a CA0) of a first socket, the address 000001 may be used, in which the three most significant bits (MSBs) signify socket zero and the three least significant bits (LSBs) identify caching agent 0 (i.e., the first core), as seen in Table 1 above. As another example, in a mode 2 system, the address 10111 refers to a third socket (based on NID <4:3>) and a third caching agent (CA3) of the socket (with reference to Table 1). While shown with these particular examples in the implementations of Tables 1 and 2, the scope of the present invention is not limited in this regard. Thus embodiments allow a tracker data structure to be used flexibly across various system configurations (e.g., 1S, 2S, 4S, 8S).

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
    a first processor including a first plurality of cores, each of which is a caching agent, and
    a first home agent configured to own a region of a memory, wherein the first home agent is configured to maintain unchanged and un-updated a current directory state of a memory location in response to a particular caching agent writing back data of the memory location to the memory and an affinity indicator, to be associated with the memory location, indicating an affinity of the memory location with the particular caching agent, and
    wherein the first home agent is configured to update the current directory state in response to the particular caching agent writing back data of the memory location to the memory and the affinity indicator not indicating an affinity of the memory location with the particular caching agent;

wherein the memory is coupled to the first processor, and wherein the memory is configured to store the directory state.

2. The system of claim 1, wherein the first home agent is to maintain unchanged and un-updated the current directory state in an exclusive state for the particular caching agent.

3. The system of claim 1, wherein the first home agent is to obtain the affinity indicator from a target address decoder associated with the memory location.

4. The system of claim 1, wherein the first home agent is to (a) maintain unchanged and un-updated the current directory state in response to a socket identifier of the particular caching agent corresponding to a socket identifier of the first home agent, and (b) update the current directory state in response to the socket identifier of the particular caching agent not corresponding to the socket identifier of the first home agent.

5. The system of claim 1, wherein the first home agent is to update the current directory state to indicate ownership of the memory location by a consumer agent in response to a producer agent writing back the data of the memory location to the memory.

6. The system of claim 5, wherein the producer agent is an input/output hub (IOH), and the consumer agent corresponds to the particular caching agent, and the IOH is to set a flag to indicate presence of the data in the memory location.

7. The system of claim 6, wherein the particular caching agent is to determine that the flag is set and to request the data from the first home agent, wherein the directory state of the memory location including the data indicates the particular caching agent to be owner of the data.

8. The system of claim 1, wherein maintenance of the current directory state is to prevent a transaction on an interconnect between the first processor and the memory to update the directory state.

9. A multicore processor comprising:

a plurality of cores, each of which is a caching agent, and a home agent configured to own a region of a memory, wherein the home agent is configured to maintain unchanged and un-updated a current directory state of a memory location in response to a particular caching agent writing back data of the memory location to the memory and an affinity indicator, to be associated with the memory location, indicating an affinity of the memory location with the particular caching agent, wherein the home agent is configured to update the current directory state in response to the particular caching agent writing back data of the memory location to the memory and the affinity indicator not indicating an affinity of the memory location with the particular caching agent;

wherein the processor is to couple to the memory, and wherein the memory is configured to store the directory state.

10. The processor of claim 9, wherein the home agent is to maintain unchanged and un-updated the current directory state in an exclusive state for the particular caching agent.

11. The processor of claim 9, wherein the home agent is to obtain the affinity indicator from a target address decoder associated with the memory location.

12. The processor of claim 9, wherein maintenance of the current directory state is to prevent a transaction, on an interconnect between the processor and the memory, to update the directory state.

* * * * *